(12) United States Patent  
Clunie et al.

(10) Patent No.: US 10,738,913 B2
(45) Date of Patent: Aug. 11, 2020

(54) SUBSEA PUMPING SYSTEM FOR PIGGING AND HYDROSTATIC TESTING OPERATIONS

(71) Applicant: Halliburton Energy Services, Inc., Houston, TX (US)

(72) Inventors: Alan Cameron Clunie, Stirling (GB); Jeffrey Gee Wai Lee, Portlethen (GB); Iain James Shepherd, Aberdeen (GB); Scott Robert Greig, Aberdeen (GB); Christopher Jake White, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/534,920

(22) Filed: Aug. 7, 2019

(65) Prior Publication Data

US 2020/0103051 A1 Apr. 2, 2020

Related U.S. Application Data

(60) Provisional application No. 62/755,296, filed on Nov. 2, 2018, provisional application No. 62/738,575, filed on Sep. 28, 2018.

(51) Int. Cl.
*F16L 1/26* (2006.01)
*E21B 41/04* (2006.01)
(Continued)

(52) U.S. Cl.
CPC .............. *F16L 1/265* (2013.01); *E21B 41/04* (2013.01); *F16L 55/46* (2013.01);
(Continued)

(58) Field of Classification Search
CPC ............ F16L 1/265; F16L 55/46; E21B 41/04; E21B 41/0007; F04B 17/03; F04B 53/16
See application file for complete search history.

(56) References Cited

U.S. PATENT DOCUMENTS 5,927,901 A 7/1999 Graves
6,539,778 B2 4/2003 Tucker et al.
(Continued)

FOREIGN PATENT DOCUMENTS

GB 254527 A 7/1926
WO WO-02084160 A1 10/2002
(Continued)

OTHER PUBLICATIONS

Korean Intellectual Property Office, PCT/US2018/068156, International Search Report and Written Opinion, dated Jun. 25, 2019, 13 pages, Korea.

(Continued)

*Primary Examiner* — James G Sayre

(57) ABSTRACT

A subsea pump and power system having a base unit positioned on the seabed to which is detachably mounted a power module tethered to a surface power source via a power umbilical. The base unit includes process pumps for carrying out subsea pumping operations and is lowered by a heavy lift cable into position on the seabed adjacent a hydrocarbon production facility prior to lowering of the power module on a tether. The power module includes a power unit which may include an electrical motor, or a hydraulic pump or both, one or more of which are driven by the umbilical extending from the surface. The tether supports the weight of the power module as it is lowered to the base unit and includes an electrical umbilical, a hydraulic umbilical or both.

20 Claims, 12 Drawing Sheets

(51) Int. Cl.
  *F16L 55/46* (2006.01)
  *F04B 53/16* (2006.01)
  *E21B 41/00* (2006.01)
  *F04B 17/03* (2006.01)
(52) U.S. Cl.
  CPC ........... *E21B 41/0007* (2013.01); *F04B 17/03* (2013.01); *F04B 53/16* (2013.01)

(56) References Cited

U.S. PATENT DOCUMENTS

| | | |
|---|---|---|
| 6,840,088 B2 | 1/2005 | Tucker et al. |
| 7,281,880 B2 | 10/2007 | Tucker et al. |
| 7,708,839 B2 | 5/2010 | Yemington |
| RE42,358 E | 5/2011 | Tucker et al. |
| 8,240,191 B2 | 8/2012 | Loeb et al. |
| 8,240,952 B2 | 8/2012 | Loeb et al. |
| 8,240,953 B2 | 8/2012 | Loeb |
| 8,955,595 B2 | 2/2015 | Emecheta et al. |
| 9,174,146 B2 | 11/2015 | Faulk et al. |
| 2004/0168811 A1 | 9/2004 | Shaw et al. |
| 2010/0085064 A1 | 4/2010 | Loeb et al. |
| 2012/0324876 A1 | 12/2012 | Fuselier et al. |
| 2015/0104328 A1* | 4/2015 | Babbitt ................ F03B 11/004 417/2 |
| 2015/0211504 A1 | 7/2015 | Dieringer et al. |
| 2017/0002651 A1 | 1/2017 | Tvedt |
| 2019/0040718 A1* | 2/2019 | Homstvedt ......... E21B 41/0007 |

FOREIGN PATENT DOCUMENTS

| | | |
|---|---|---|
| WO | WO-2003002403 A1 | 1/2003 |
| WO | WO 2018/004040 A1 | 1/2018 |

OTHER PUBLICATIONS

International Search Report and Written Opinion issued for International Patent Application No. PCT/US2019/030026, dated Aug. 14, 2019, 13 pages.

\* cited by examiner

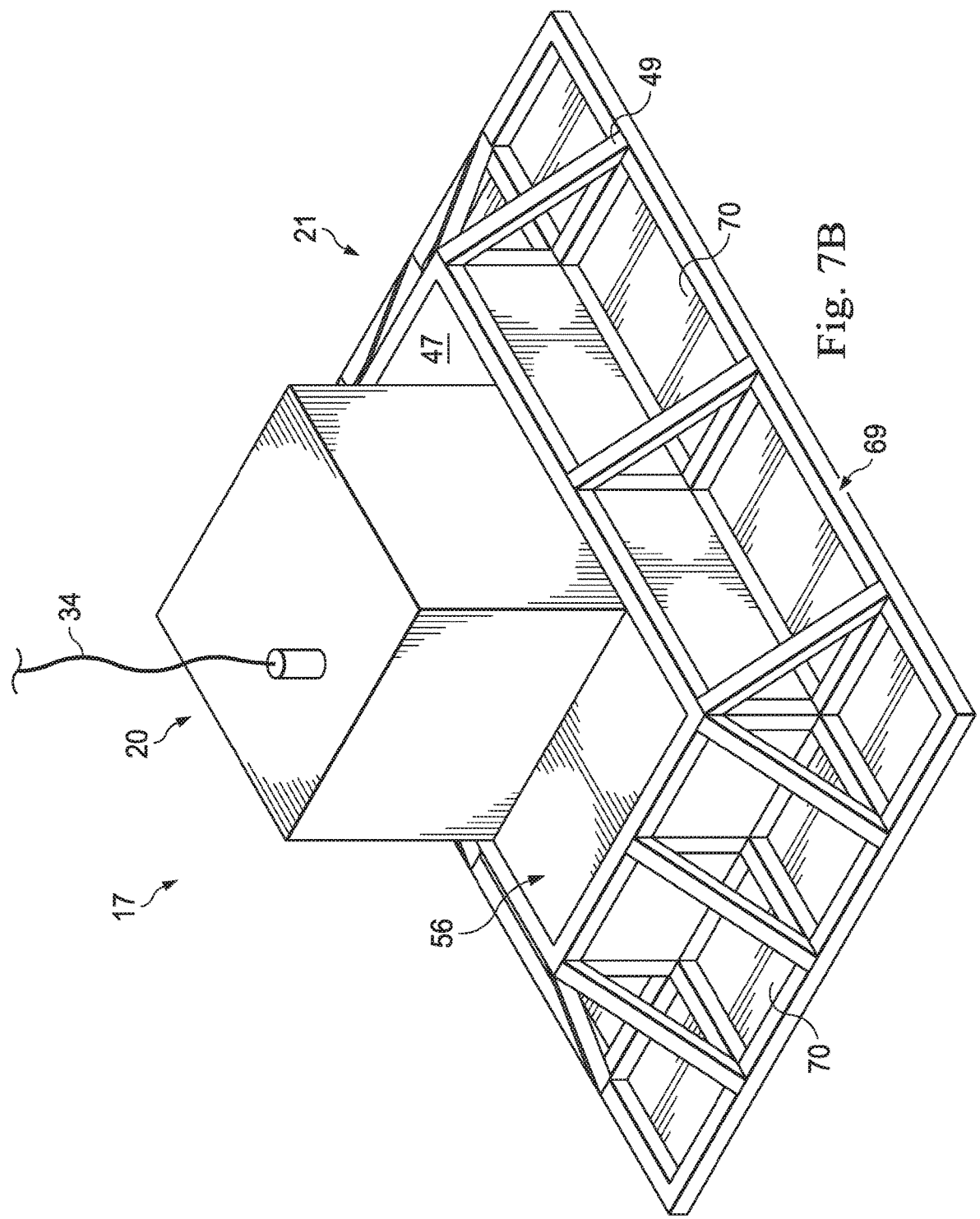

SUBSEA PUMPING SYSTEM FOR PIGGING AND HYDROSTATIC TESTING OPERATIONS

CROSS-REFERENCE TO RELATED APPLICATION

This application claims the benefit of priority to International Patent Application No.: PCT/US2019/030026, filed Apr. 30, 2019, which claims priority to U.S. Provisional Application No. 62/755,296, filed Nov. 2, 2018 and International Patent Application No. PCT/US2018/068156, filed Dec. 31, 2018, which claims priority to U.S. Provisional Application No. 62/738,575, filed Sep. 28, 2018, all of the benefits of which are claimed and the disclosures of which are incorporated by reference in their entireties.

BACKGROUND

During subsea pipeline pre-commissioning or other subsea pumping operations into wells or pipelines, a remotely operated vehicle (ROV) is often utilized to provide power to locally deployed pumps. For example, high pressure and lower pressure pumps may be deployed on a skid for subsea pumping or hydrotesting of a pipeline. The skid may be carried by an ROV or deployed on the ocean floor adjacent a pipeline. The ROV is utilized to connect the pumps of the skid to the pipeline or an appropriate manifold. Thereafter, power from the ROV is utilized to operate the pumps. However, the operations are limited by the available power from the ROV. In many cases, the lack of power means the pumps cannot achieve the desired pump flowrates for a particular operation. For example, lower pump flowrates may limit flooding pig speed through the pipeline, chemical injection rates or the rate of pressurization.

BRIEF DESCRIPTION OF THE DRAWINGS

For a more complete understanding of the present disclosure and the advantages thereof, reference is now made to the following brief description, taken in connection with the accompanying drawings and detailed description:

FIG. 7B is a perspective view of a subsea pump and power system once a power module has been engaged with a base unit.

DETAILED DESCRIPTION OF THE EMBODIMENTS

Figure 1A:
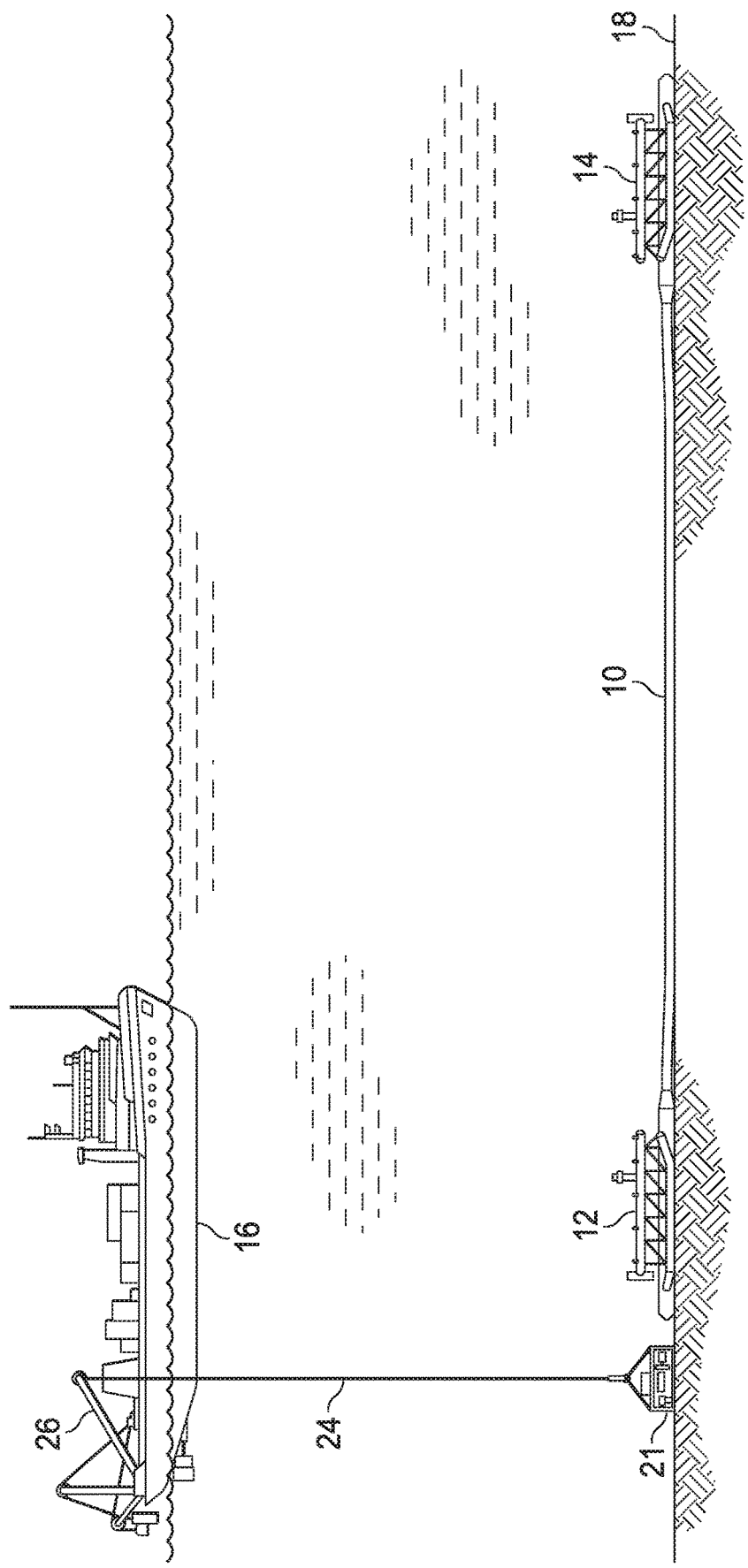
FIG. 1A is a schematic view of a base unit being lowered on a heavy lift cable from a surface vessel for placement on the seabed adjacent a hydrocarbon production facility.

Disclosed herein are embodiments of a subsea pump and power system having a base unit positioned on the seabed to which is detachably mounted a power module tethered to a surface power source via a power umbilical. The tether supports the weight of the power module as it is lowered to the base unit and includes an electrical umbilical, a hydraulic umbilical or both. The base unit includes process pumps for carrying out subsea pumping operations and is lowered by a heavy lift cable into position on the seabed adjacent a hydrocarbon production facility prior to lowering of the power module on the tether. The power module may be lowered together with the base unit on the heavy lift cable and positioned on the seabed, or the power module may be lowered separately by its tether. In some embodiments, the base unit may be lowered to the seabed and utilized for certain initial operations not requiring the power unit, such as pipeline flooding, and then the power unit is subsequently lowered into position on the base unit for those operations requiting local power, such as chemical injection operations. The power module includes a power unit which may include an electrical motor, or a hydraulic pump or both, one or more of which are driven by the umbilical extending from the surface. The base unit includes a mechanism for attachment of the base unit to the power module. The power module includes a mechanism for attachment of the power module to the base unit. The engagement mechanisms of the base unit and the power module allow the power module to be releasably detached to the base unit for operations. Furthermore, the engagement mechanisms may include hot stabs to allow one or more of electrical connection, hydraulic connection, and fluidic connection between the power module and the base unit. The engagement mechanisms may include pins or projections that align with apertures or seats to allow attachment of the power module with the base unit.

In one or more embodiments, in addition to the process pumps, the base unit may include filtration or other water treatment systems. In one or more embodiments, the base unit may include at least one manipulator arm to facilitate connection of the base unit with a hydrocarbon production facility. In one or more embodiments, the base unit may include mud mats extending from the perimeter to prevent sinking in soft soil conditions. The mud mats are particularly desirable in certain embodiments because of the weight of the base unit carrying the above described equipment, but also the additional weight added to base unit by virtue of the power module mounted on top of the base unit.

More specifically, in one or more embodiments, the base unit includes one or more process pumping systems, which may include at least one of a high pressure pump, a low pressure pump or both. In one or more embodiments, the power module seats on top of the base unit to provide electric and/or hydraulic power to the process pumps of the base unit. In one or more embodiments, a remotely operated vehicle (ROV) may be utilized to guide the power module into position on top of the base unit. In this regard, it will be appreciated that the power module may have negative buoyancy to allow it to be readily lowered down on the power cable. A control panel may be provided on the power module or the base unit for manipulation by the ROV and operation of the subsea pump and power system. The power module or the base unit may include batteries, generators or other power storage or generation systems.

In FIG. 1A, a host facility 16, such as a surface platform or vessel, is positioned above hydrocarbon production facility 10 and the base unit 21 of a subsea pump and power system 17 (see FIG. 1B) is deployed from vessel 16 and lowered to a location on the seabed 18 near a hydrocarbon production facility 10, such as a pipeline, wellhead or subsea manifold. For convenience, host facility 16 will be referred to as a vessel herein, but persons of skill in the art will appreciate that host facility 16 may be any marine structure from which pumping operations may be staged. As used herein, hydrocarbon production facility 10 may generally refer to any subsea system used in the production of hydrocarbons, including any one or more of the wellbore, downhole equipment, wellhead, manifolds, pipelines, or risers to the host facility, which may be a platform on the surface, FPSO or an onshore system. Likewise, as used herein, manifold is used as a generic term to refer any wellhead trees, pipeline end manifolds (PLEMs), and pipeline end terminators (PLETs), to name a few, to carry out pumping operations. More specifically, the base unit 21 is lowered from vessel 16 and positioned on the seabed 18 in the vicinity of a hydrocarbon production facility 10 for use in one or more pumping operation, such as hydrostatic testing or pipeline pigging or chemical injection. Because of the weight of the equipment, described below, on the base unit 21, the weight of the base unit 21 generally requires a heavy lift cable 24 that can support such weight, typically guided by a heavy lift crane 26. In one or more embodiments, heavy lift cable 24 is non-conducting crane wire. For example, heavy lift cable 24 may be a non-conducting, braided 17 wire rope.

Figure 1B:
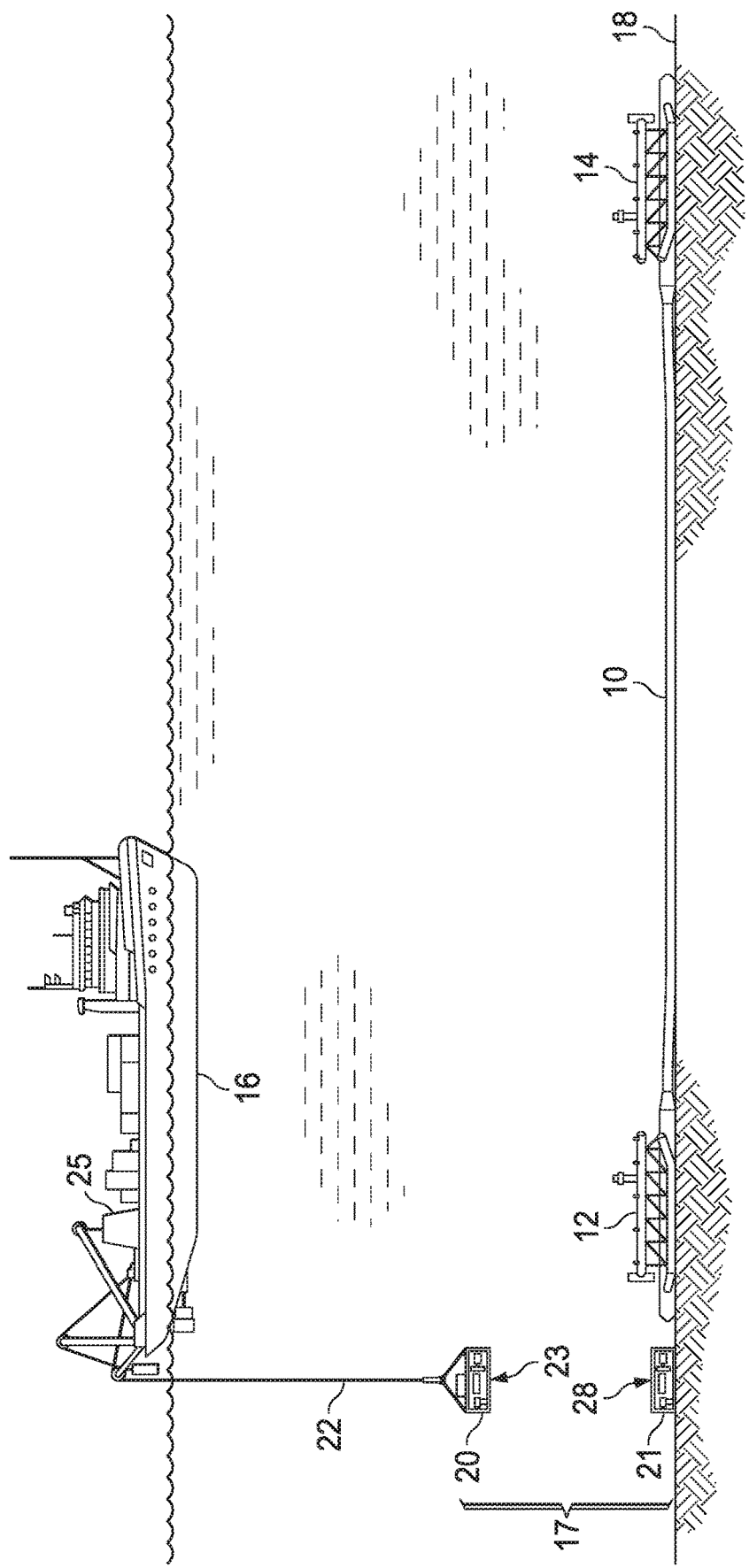
FIG. 1B is a schematic view of power module being lowered on a tether from a surface vessel for engagement with a base unit positioned on the seabed.

Turning to FIG. 1B, in some embodiments, with the base unit 21 in position on the seabed 18, a power module 20 is lowered by a tether or power cable 22 from vessel 16. In one or more embodiments, tether 22 may be or otherwise include an electrical umbilical, a hydraulic umbilical and/or a fiber optic element. In one or more embodiments, tether 22 does not have the load bearing capacity of heavy lift cable 24 given that power module 20 weighs significantly less than base unit 21. In other embodiments, power module 20 may be attached to base unit 21 and the assembled subsea pump and power system 17 may be lowered to seabed 18 utilizing a heavy lift cable 24, or alternatively, base unit 21 may be lowered to the seabed 18 as described above and then power module 20 may be lowered to the seabed 18 on a non-conducting line, such as cable 24, into engagement with the base unit 21. In either of these configurations, tether 22 may also be stabbed into power module 20, but is not utilized in the lowering process or to support the weight of the assembled subsea pump and power system 17. Alternatively, once subsea pump and power system 17 is in position on the seabed, tether 22 may be subsequently attached to power module 20, such as by utilizing a remotely operated vehicle (ROV) (see FIG. 2A) to stab tether 22 into power module 20 once power module 20 is mounted on base unit 21. In FIG. 1, a hydrocarbon production facility 10 is a deep-water pipeline which lies on or near the seabed 18 between manifolds, such as PLEM 12 and a second PLEM 14, either of which may be a fluid injection point for pumping operations. In any event, a power source 25 deployed at the surface may provide electricity and/or hydraulic fluid to power module 20 via tether 22.

In one or more embodiments, power module 20 is a negative buoyancy system consisting of a platform to support one or more power units 23, which may include an electrical motor, a hydraulic motor or both, which are driven by the umbilical(s) extending from the surface as part of tether 22. Thus, tether 22 may be an umbilical that can provide, either alone or in combination with other power sources, electric current for the electric motor and/or a hydraulic fluid for the hydraulic motor carried by power module 20.

In one or more embodiments, base unit 21 is a negative buoyancy system consisting of a platform or skid to support one or more pumping components 28, which may include process pumps, fluid tanks, and filters.

As will be explained in more detail below, the power module 20 is lowered by tether 22 to seat on base unit 21. In some embodiments, power module 20 seats on top of base unit 21 so that base unit 21 bears the weight of power module 20 once lowered into position on top of base unit 21. In this regard, once power module 20 is seated on base unit 21, it will be appreciated that tension in tether 22 is released and tether 22 is slack.

Figure 2A:
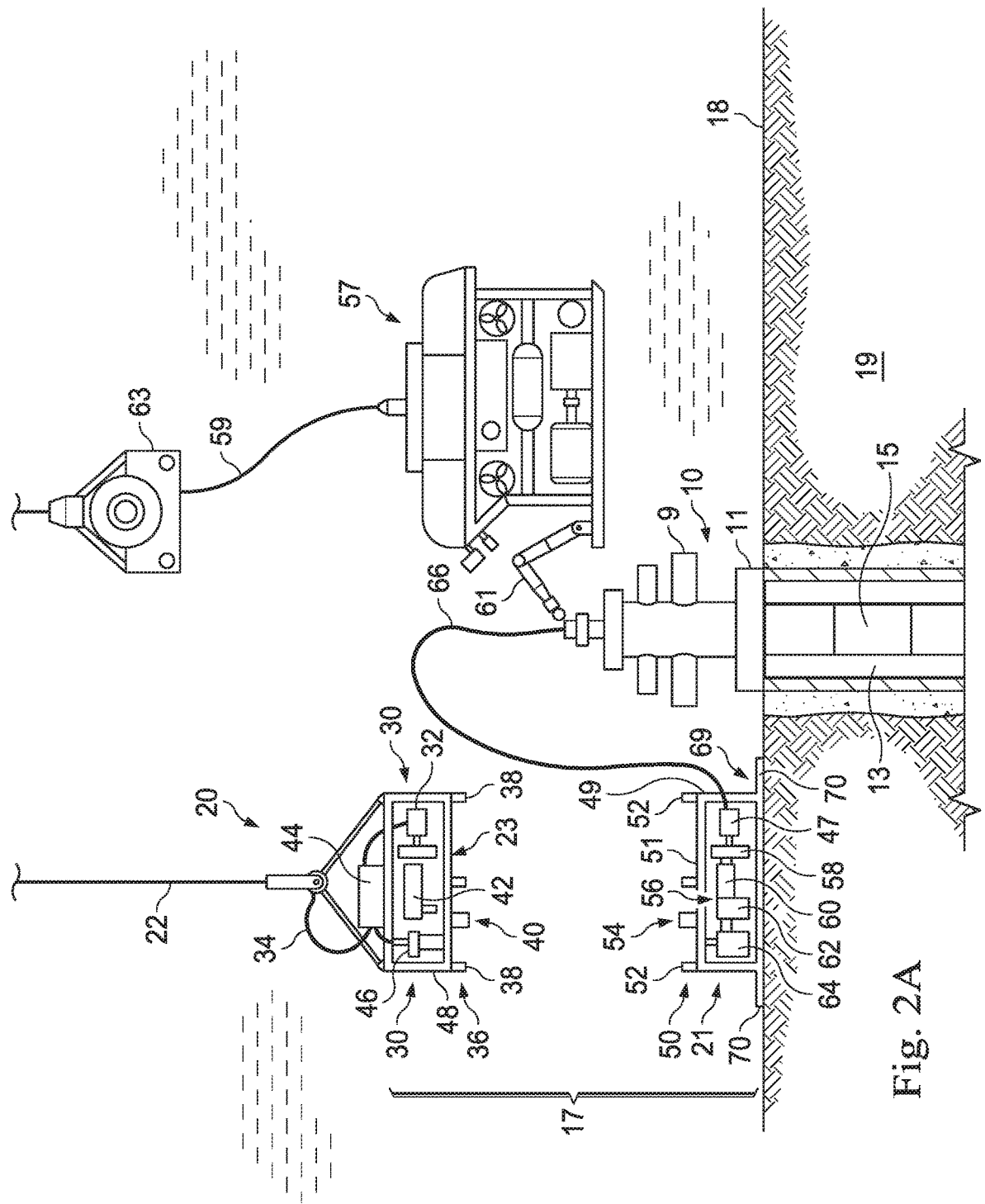
FIG. 2A is a schematic view of a subsea pump and power system prior to engagement of the power module with a base unit positioned on the seabed adjacent a wellbore.

Turning to FIG. 2A, the power module 20 of a subsea pump and power system 17 is illustrated as the power module 20 is being lowered by a tether 22 to the vicinity of wellhead 11 positioned over a wellbore 13 with production equipment 15 deployed therein and used for the production of hydrocarbons from formation 19. Well head 11 may include blowout preventers 9 or other equipment. In particular, the power module 20 is being lowered towards a base unit 21 deployed on seabed 18 adjacent wellhead 11.

The power module 20 includes a power unit 23 which may include one or more motors 32, such as an electrical motor, a hydraulic motor or both, which motor(s) is driven by an umbilical 34 forming part of tether 22 extending from vessel 16 (see FIG. 1). Umbilical 34 may be an electric line for delivering current to power module 20. Umbilical 34 may be a hydraulic conduit for delivering a hydraulic fluid to power module 20. Umbilical 34 may include both an electrical line and a hydraulic conduit, as well as a fiber optic element. The power module 20 includes one or more engagement mechanisms 36 for attachment of the power module 20 to the base unit 21. In one embodiment, the engagement mechanism 36 includes mechanical connectors 38 such as projections, pins, latches, apertures, seats or similar devices that engage mechanical connectors 50 of base unit 21. In one or more embodiments, the engagement mechanism 36 further includes an operational connector 40, such as a hot stab. Operational connector 40 may allow electric, fluidic, fiber optic, and/or hydraulic communication between components of the power module 20 and components of the base unit 21.

In one or more embodiments, power module 20 may include one or more hydraulic pumps 42 operated by motor 32. The power module 20 may also include local, on-board power systems 46 for local power storage or local power generation, such as batteries or generators, respectively. In some embodiments, the umbilical 34 includes a communications line for real time, step-less control and data transfer with a local, on-board control and logging system 44 on power module 20. It will be appreciated that such a system allows more responsive monitoring and control of subsea pump and power system 17 than would operation of a subsea system remotely, such as via an ROV. In alternative embodiments, an ROV may be used to control certain functions of subsea pump and power system 17 that are not time sensitive, while other control functions may be managed directly from vessel 16 (see FIG. 1A) in real time.

Power module 20 may be formed of a frame 48 on which the various components of power module 20, such as motor 32 and hydraulic pumps 42, are supported. Although these various components, which in addition to motor(s) 32 and hydraulic pump(s) 42 may include on-board power system(s) 46 and on-board control and logging system 44, should be sufficient to create an overall negative buoyancy for power module 20, frame 48 may be utilized to provide additional weight as needed for such purpose.

In one or more embodiments, base unit 21 may include one or more process pumps 47 for pumping water, chemicals or other liquid in order to perform a particular pumping operation. Process pumps 47 may include a high pressure pump for hydrostatic testing; a low pressure pump for flooding and pigging operations; a chemical pump for chemical injection; or a combination of any of these pumps. In some embodiments, process pumps 47 include both a high pressure pump for high pressure pumping operations and a low pressure pump for low pressure pumping operations.

Base unit 21 may include one or more fluid vessels or tanks 64. In some embodiments, vessel 64 may be utilized to store a chemical for use in a particular subsea pumping operation, such as treatment of a hydrocarbon production facility 10. In other embodiments, vessel 64 may be utilized in the treatment or processing of seawater, as described below, whereby the treatment or processing of seawater may be carried out in the vessel 64. In either case, it will be appreciated that vessel(s) 64, particularly to the extent charged with a particular chemical, will add significant weight to base unit 21. In some embodiments, vessel 64 may be flooded or charged with seawater prior to or during deployment.

Base unit 21 includes one or more engagement mechanisms 50 for attachment of the base unit 21 to power module 20. In one embodiment, the engagement mechanism 50 includes mechanical connectors 52 such as projections, pins, latches, apertures, seats or similar devices that engage mechanical connectors 38 of power module 20. In one or more embodiments, the engagement mechanism 50 further includes an operational connector 54, such as a hot stab. Operational connector 54 may allow electric, hydraulic, and/or fiber optic communication between components of the power module 20 and components of the base unit 21. For example, operational connector 54 may be in fluid communication with process pump 47 and may engage with operational connector 40 of power module 20 to allow hydraulic fluid to be pumped from power module 20 to base unit 21 in order to operate a process pump 47 carried by base unit 21. Thus, one of connector 40 and connector 54 may be a male connector and the other of connector 40 and connector 54 may be a female connector which engage one another to establish fluidic or electrical connections between power module 20 and base unit 21. Moreover, in one or more embodiments, the operational connectors 40, 54 may be rigid or fixed to the power unit 20 and base unit 21, respectively, so that the connectors 40, 54 engage one another as power module 20 is seated on base unit 21. Alternatively, one of the connectors 40, 54 may be disposed on a flexible line and the connector stabbed into the corresponding connector (such as by ROV 57) after power module 20 has seated on base unit 21. In any event, in some embodiments, engagement mechanism 50 is positioned adjacent a top side 51 of base unit 21, where the top side 51 generally faces upward to facilitate landing and seating of the power module 20 on the base unit 21. This allows generally upwardly facing engagement mechanism 52 of the base unit 21 to engage generally downwardly facing engagement mechanism 38 of the power module 20 to secure the power module 20 to the base unit 21.

Subsea pump and power system 17 may also include one or more water treatment systems 56 for treatment of seawater prior to injection into a hydrocarbon production facility 10. This treatment may include filtration, chemical treatment, such as with inhibitors, oxygen scavengers, dyes, or the like, and/or ultra violet irradiation of the seawater. For example, water treatment systems 56 may be a filtration system with one or more filter modules 58. In one embodiment, filter modules 58 may be interchangeable. In one embodiment, interchangeable filter modules 58 may include filters ranging from 2 microns to 50 microns in predetermined increments, such as a 2 micron filter, a 10 micron filter, a 15 micron filter, a 20 micron filter, a 25 micron filter, etc. In other embodiments, interchangeable filter modules 58 may include filters over 50 microns. Filter modules 58 may be interchangeable at the surface or in-situ by a remotely operated vehicle (ROV) 57. Filter modules 58 may be interchanged for a particular operation, where it might be desirable for a first filter module in a first operation and a second filter module of a different filer capacity for a different operation. Alternatively or in addition, water treatment system 56 may include an ultra-violet (UV) light module 62 for treatment of seawater.

In one or more embodiments, water treatment system(s) 56 is mounted on base unit 21, while in other embodiments, components of water treatment system 56 may be mounted on power module 20, particularly if the components do not add significant weight to power module 20. For example, the filter modules 58 of water treatment system 56 may be mounted on power module 20, while the other components of water treatment system 56, such as pumps, may be mounted on base unit 21. As such, filter modules 58 may be readily retrieved with power module 20 and interchanged as necessary. In other words, power module 20 can be more easily disengaged from base unit 21, retrieved and redeployed back to base unit 21 as opposed to retrieving all of subsea pump and power system 17.

In any event, water treatment system 56 may include one or more treatment pumps 60 carried on base unit 21 to permit chemical dosing or to drive fluid through the filter modules 58. In some embodiments, water treatment system 56 may include one or more of filters 58, treatment pumps 60, UV light modules 62 and fluid vessels 64 which may be utilized in any order to pre-treat seawater prior to injection into a hydrocarbon production facility 10. For example, seawater may be pumped by treatment pump 60 carried on base unit 21 through a filter 58 carried on either the base unit 21 or power module 20, after which the filtered water may be subjected to UV light from UV light module 62 and doused with chemicals from vessel 64. In an alternative embodiment, chemicals may be delivered to base unit 21, and water treatment system 56 in particular, via umbilical 34. Moreover, these various treatments or processing of seawater may be carried out in vessel(s) 64.

Base unit 21 may be formed of a skid or frame 49 on which the various components of base unit 21, such as process pumps 47 and chemical vessels 64, are supported.

In one or more embodiments, base unit 21 or power module 20 may include at least one manipulator arm 65 (see FIG. 2B) to facilitate connection of subsea pump and power system 17 with a hydrocarbon production facility 10. In this regard, a fluid line 66, such as a flexible conduit, hose or other tubing, may extend from base unit 21 to hydrocarbon production facility 10. Line 66 includes a stab for connecting to a receptacle in hydrocarbon production facility 10 to establish fluid communication with subsea pump and power system 17. Manipulator arm 65 may be used to stab line 66 into hydrocarbon production facility 10 without the need for an ROV.

In one or more embodiments, base unit 21 may include a mud mat assembly 69. Mud mat assembly 69 may include one or more mud mats 70 extending from the perimeter of base unit 21 to prevent subsea pump and power system 17 from sinking into son soil or mud of seabed 18. In the illustrated embodiment, mud mats 70 extend around the perimeter of base unit 21 and are supported by frame 49. Preferably, mud mats 70 are generally horizontal when base unit 21 is suspended from heavy lift cable 24. It will be appreciated that mud mats 70 are not limited to a particular structure, but may be any structure extends from base unit 21 to provide stability to base unit 21 to prevent the subsea pump and power system 17 from sinking into soft soil or mud of seabed 18. For example, mud mats 70 may be flat, or corrugated plates or screen. The mud mats 70 are especially desirable in certain embodiments because of the significant weight of base unit 21, particularly when power module 20 is mounted on base unit 21.

Figure 2B:
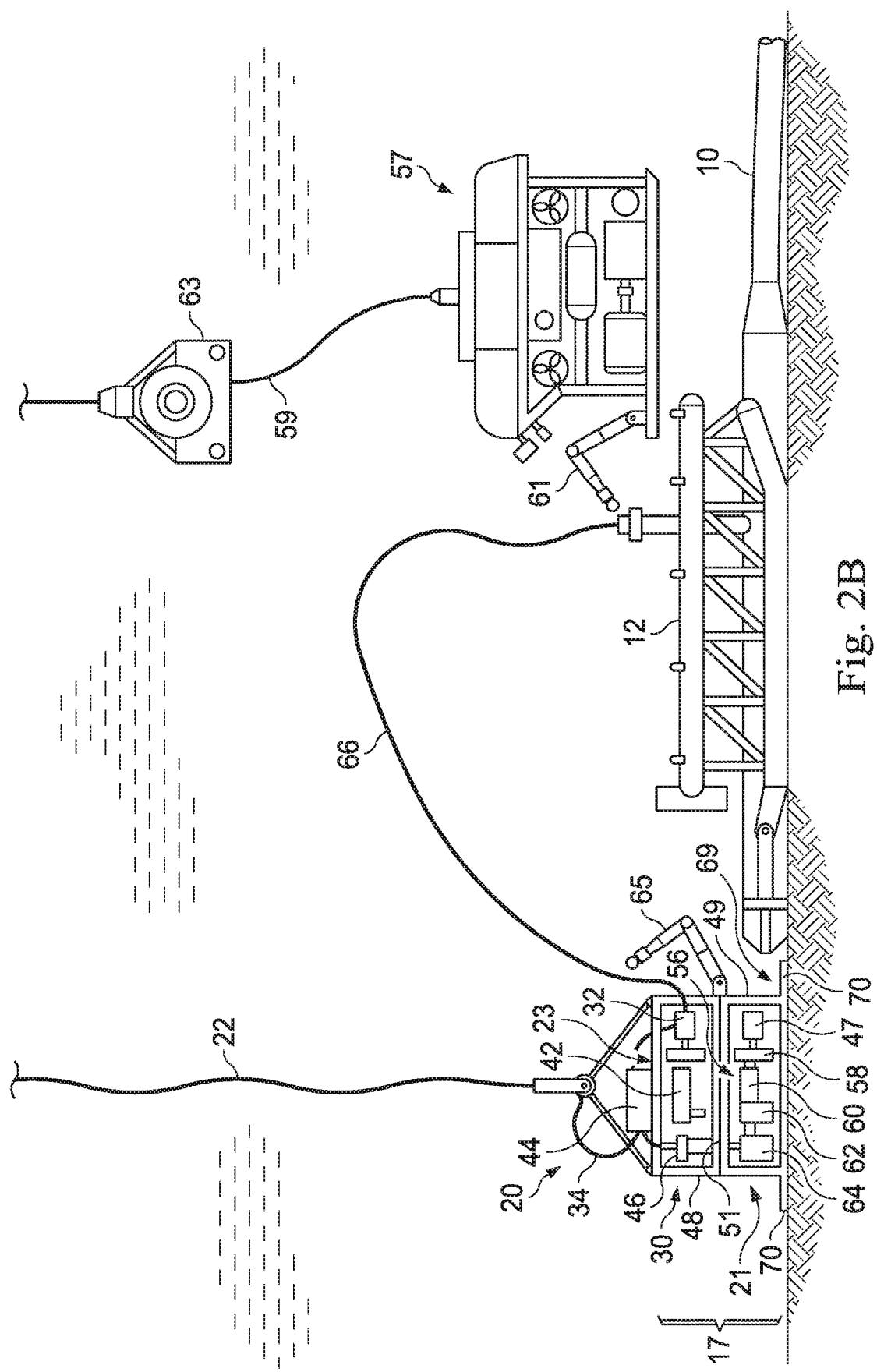
FIG. 2B is a schematic view of a subsea pump and power system once a power module has been engaged with a base unit positioned on the seabed adjacent a pipeline.

Turning to FIG. 2B, power module 20 is shown mounted on base unit 21. In one or more embodiments, power module 20 engages the top side 51 of base unit 21, it being appreciated that top side 51 is readily disposed to land power module 20 on as power module 20 is lowered into position by tether 22. Engagement mechanisms 36 and engagement mechanisms 50 facilitate mechanical, electrical and hydraulic attachment between power module 20 and base unit 21. In particular, as power module 20 is landed on base unit 21, operational connectors 40, 54 (see FIG. 2A) engage to establish electrical and/or fluidic communication between base unit 21 and power module 20. In any event, in one or more embodiments, it will be appreciated that base unit 21 and power module 20 are deployed independently of one another, with the heavier base unit 21 positioned on seabed 18 first by heavy duty cable and the lighter power module 20 separately lowered by tether 22 into engagement with the base unit 21.

A fluid line 66 extends between subsea pump and power system 17 and hydrocarbon production facility 10. To the extent fluid line 66 extends from base unit 21, fluid line 66 may be attached to hydrocarbon production facility 10 prior to landing of power module 20 on base unit 21. For example, an ROV 57 may be utilized to hot stab line 66 into a receptacle on hydrocarbon production facility 10. Alternatively, once power module 20 is landed on base unit 21, hydraulic pumps 42 on power module 20 may be utilized to operate manipulator arm 65.

In one embodiment of operation of the subsea pump and power system 17, the treatment pump 60 of the base unit 21 is interconnected with treatment system 56 of power module 20 so that operation of treatment pump 60 draws water through treatment system 56 and into treatment pump 60. Thereafter, the treated water may be directed back to base unit 21 to be delivered into a pipeline or well via line 66 (FIG. 2A). Alternatively, treatment pump 60 of base unit 21 may pump the treated water directly into the pipeline or well from power module 20 via line 66 extending therefrom (FIG. 2B). In such an arrangement, water treatment system 56 is provided on the upstream side of treatment pump 60 so that the seawater is drawn through filter module 58 and any other components of water treatment system 56. The parameters of the pumping and any hydrotest operations will be recorded and transferred to surface via the control and communication system 46 and umbilical 34.

In one or more embodiments, a power module 20 is interchangeable on base unit 21, which can remain in situ on the seabed 18 and connected via fluid line 66 to a hydrocarbon production facility 10 as power modules 20 are interchanged. Thus, for certain operations, a first power module 20 may be landed on base unit 21, while in other operations a different second power module 20 may be landed on base unit 21. As used herein, reference to a second or different power module 20 may simply be the first power module 20 once it has been retrieved from the seabed 18. In some embodiments, the second power module may simply be the first power module reconfigured with different equipment or components once it has been retrieved.

In all cases, the various operations may require treatment of seawater utilizing the water treatment system 56. For example, a first power module 20 may carry a filter module 58 or UV light module 62 having first operational parameters selected for use with a desired operation, such as flooding or pigging operations. The first power module 20 may be landed and utilized for pigging. Prior to utilizing process pump 47 to inject the seawater into a hydrocarbon production facility 10, such as a pipeline, for such pigging, the seawater may be treated by water treatment system 56 utilizing the filter module 58 or UV light module 62 of the first power module 20. Once such pigging operations are complete, the first power module 20 may be retrieved by tether 22 and a second power module 20 may be lowered from vessel 16 by tether 22 onto base unit 21. The second power module 20 may carry filter module 58 or UV light module 62 having second operational parameters selected for use with a different operation, such as hydrostatic testing operations. Again, prior to utilizing the process pump 47 of base unit 21 to inject the water into a pipeline for hydrostatic testing operations, the seawater may be passed through water treatment system 56 of second power module 20. Likewise, in other operations, base units 21 may be interchangeable. For example, a first base unit 21 may carry a process pump 47 that is a low pressure, high volume pump used in flooding or pigging operations. The first base unit 21 may be deployed on the seabed 18 and utilized for pigging. Once the first base unit 21 is deployed on the seabed 18, the power module 20 may be landed on the first base unit 21 for control of the pumping operation. When such pigging operations are complete, the power module 20 may disengaged from the base unit 21 and the base unit 21 may be retrieved by a heavy lift heavy lift cable 24 and a second base unit 21 may be lowered from vessel 16 by heavy lift heavy lift cable 24 to the seabed 18. The second base unit 21 may carry a process pump 47 that is a higher pressure, lower volume pump for use in hydrostatic testing operations. Again, once the second base unit 21 is deployed on the seabed 18, the power module 20 may be landed on the second base unit 21 for control of the pumping operation.

Treatment pump 60 of base unit 21 may be used to pump seawater through line 66 and power module 20 may be utilized to provide power to treatment pump 60 and water treatment system 56.

Once power module 20 is landed on base unit 21, to facilitate connection of base unit 21 to hydrocarbon production facility 10 via line 66, manipulator arm 65 may be powered and controlled by power module 20 and used to stab line 66 into hydrocarbon production facility 10 without the need for an ROV such as ROV 57. The manipulator arm 65 may be fitted with project specific hot stabs which interface with the hydrocarbon production facility 10.

It will be appreciated that process pumps 47, chemical vessels 64 and water treatment system 56, as well as landed power module 20, may impose significant weight on base unit 21. Thus, mud mats 70 extending from base unit 21 may be utilized to stabilize subsea pump and power system 17.

Once power module 20 has been landed on base unit 21, motor 32 can then be operated by virtue of umbilical 34. Motor 32 may be an electric motor and umbilical 34 supplies electric current to the electric motor. Motor 32 may be hydraulically operated and umbilical 34 supplies hydraulic fluid to motor 32. Regardless, motor 32 may be used to operate one or more pumps carried by power module 20, base unit 21 or both. For example, to the extent power module 20 includes a hydraulic pump 42, motor 32 may be utilized to operate hydraulic pump 42 to pressurize a hydraulic fluid. Alternatively, motor 32 can be used to provide power to treatment pump 60 carried on base unit 21. Umbilical 34 may also supply power to local, on-board power systems 46 deployed on either base unit 21 or power module 20 for storage of electricity locally, such as in by batteries. Umbilical 34 may also include a communications line for real time, step-less control and data transfer with a local, on-board control and logging system 44 on power module 20.

In any event, treatment pump 60 may be utilized to pump seawater through a water treatment system 56, where the seawater may be filtered by filters 58, UV treated by UV light module 62 and/or chemically treated utilizing chemicals from vessel 64. Alternatively, process pump 47 may be utilized to pump water through water treatment system 56.

In one or more embodiments, an independently operated ROV 57 operating on a separate umbilical 59 may be utilized to guide the power module 20 into position on top side 51 of base unit 21. ROV 57 may include a manipulator arm 61, and separate umbilical 59 may extend from a tether maintenance system 63 suspended from the surface. Although lighter than base unit 21, it will be appreciated that the power module 20 will have a negative buoyancy to allow it to be readily lowered down on tether 22.

A control panel 72 (see FIG. 4B) may be provided on the power module 20 or the base unit 21 for manipulation by the ROV 57 and operation of subsea pump and power system 17.

Figure 3A:
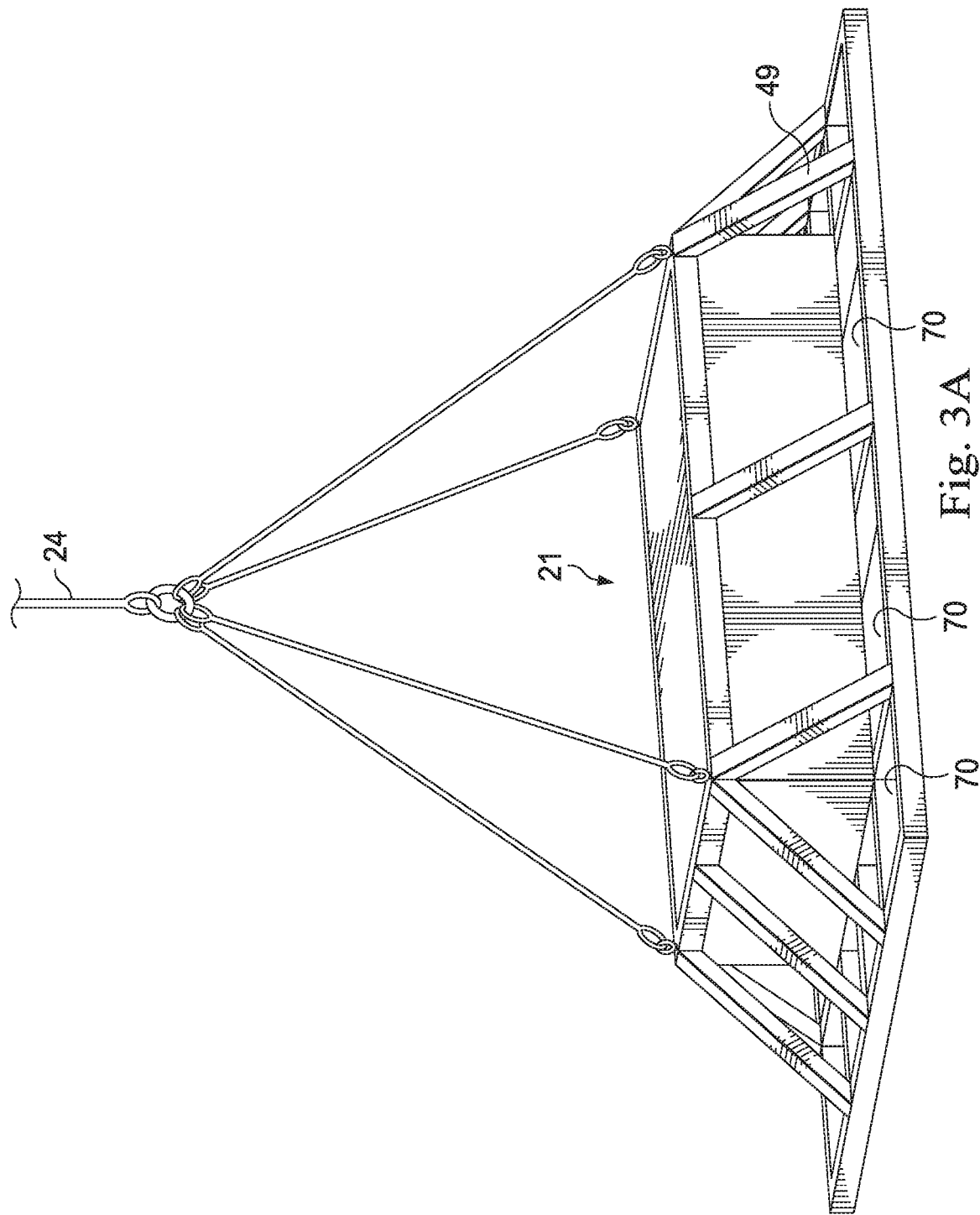
FIG. 3A is a perspective view of a base unit of the subsea pump and power system of FIG. 1.

FIG. 3A is a perspective view of the base unit 21 suspended from a heavy lift cable 24. As shown, base unit 21 includes a frame 49 which supports one mud mats 70 extending at least partially around the perimeter of base unit 21. It will be appreciated that during deployment, base unit 21 may be lowered by a weight bearing cable, such as heavy lift cable 24, into position on the seabed. Given the weight of base unit 21, heavy lift cable 24 is different than tether 22 utilized to lower power module 20. In any event, it will be appreciated that in cases where power module 20 is lowered by tether 22, base unit 21 is lowered independently of power module 20. In other embodiments, heavy lift cable 24 may be utilized to lower both power module 20 and base unit 21, after which a separate power umbilical 34 may be stabbed into or otherwise connected to power module 20 (such as by ROV 57 of FIG. 2b) once subsea pump and power system 17 is positioned on the seabed, it being understood that power umbilical 34 cannot support the weight of base unit 21. Once in position on the seabed, heavy lift cable 24 may be released and withdrawn.

Figure 3B:
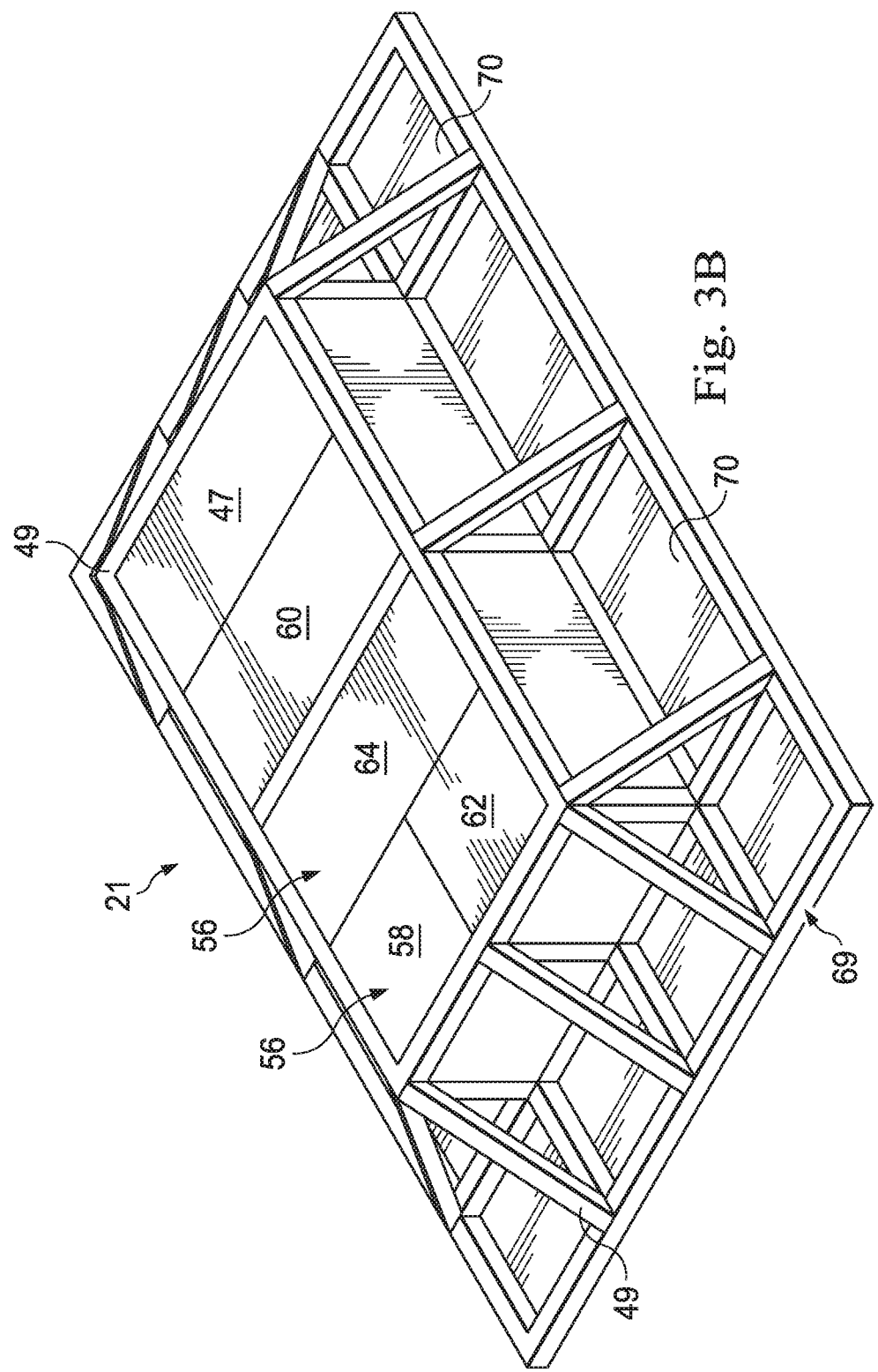
FIG. 3B is another perspective view of a base unit of a subsea pump and power system.

FIG. 3B is a perspective view of the base unit 21 better illustrating one or more process pumps 47 and one or more water treatment systems 56 carried by a frame 49 of base unit 21. Specifically, water treatment system 56 includes a filter module 58 through which seawater is drawn. Filter module 58 may be interchangeable to al low filters of different ratings to be utilized as desired. Water treatment system 56 may also include one or more treatment pumps 60 to permit chemical dosing. Alternatively or in addition, water treatment system 56 may include an ultra-violet (UV) light module 62 for treatment of seawater. Finally, water treatment system 56 may include one or more chemical vessels 64 for treatment. Also shown, base unit 21 includes a mud mat assembly 69 extending from frame 49 with one or more mud mats 70 extending at least partially around the perimeter of base unit 21.

Figure 4:
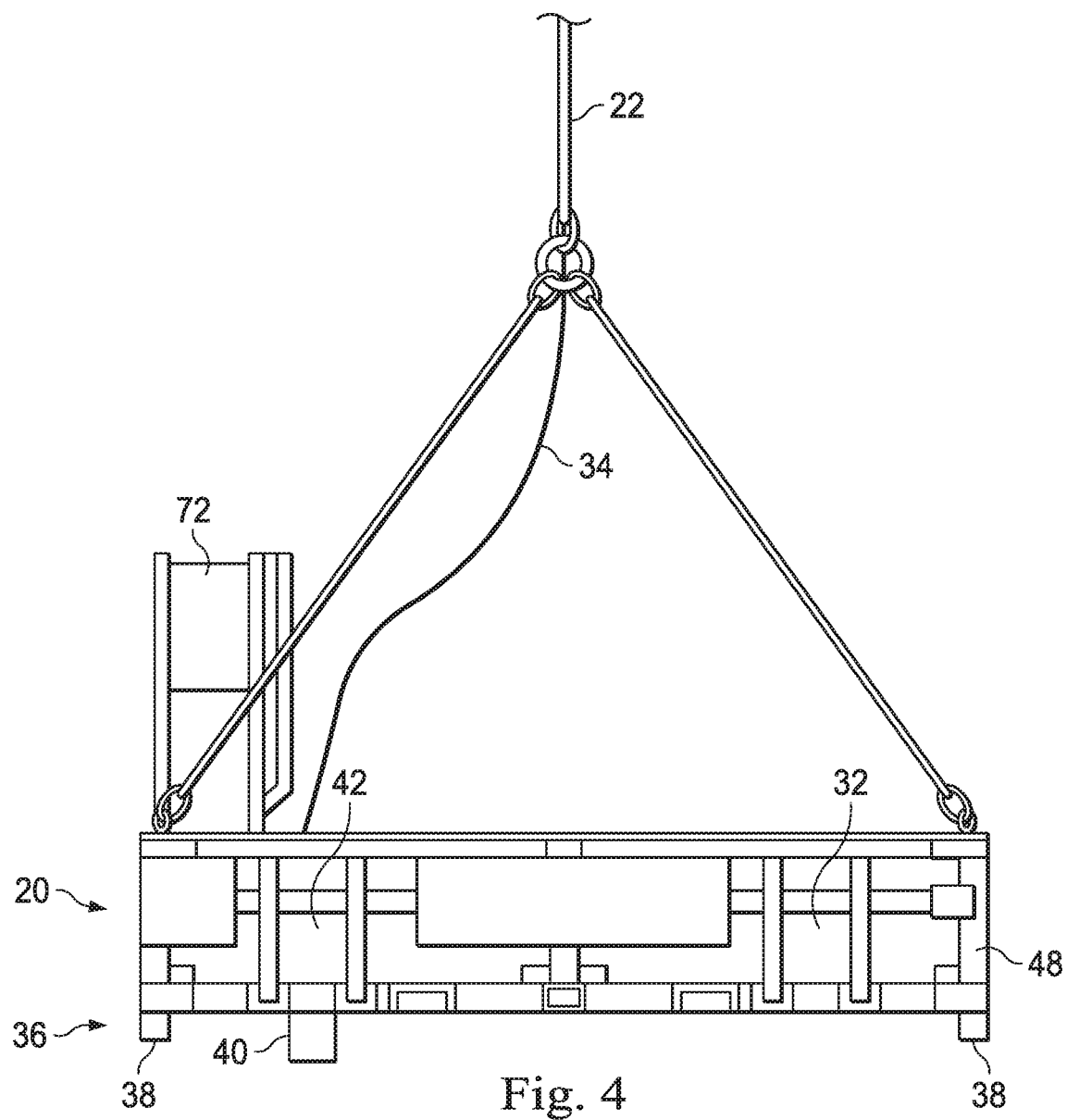
FIG. 4 is an elevation view of a power module of a subsea pump and power system.

FIG. 4 is a side elevation view of power module 20 suspended from a tether 22 extending to the surface where tether 22 comprises an umbilical 34 which may include an electric line, a fluidic line, and/or a fiber optic line. In this embodiment, tether 22 is a weight bearing umbilical 34. Supported on frame 48 is a motor 32 as described above. In addition, power module 20 may include one or more hydraulic pumps 42, which may be in fluid communication with an operational connector 40 to allow hydraulic pump 42 to fluidly communicate with one or more process pumps 47 or water treatment system(s) 56 of base unit 21. In addition to operational connector 40, engagement mechanism 36 may also include mechanical connectors 38 to allow attachment of power module 20 to base unit 21. Power module 20 is also illustrated as having a control panel 72 which may be utilized by an ROV, such as ROV 57 of FIG. 2A, to operate certain aspects of subsea pump and power system 17 as described herein.

Figure 5:
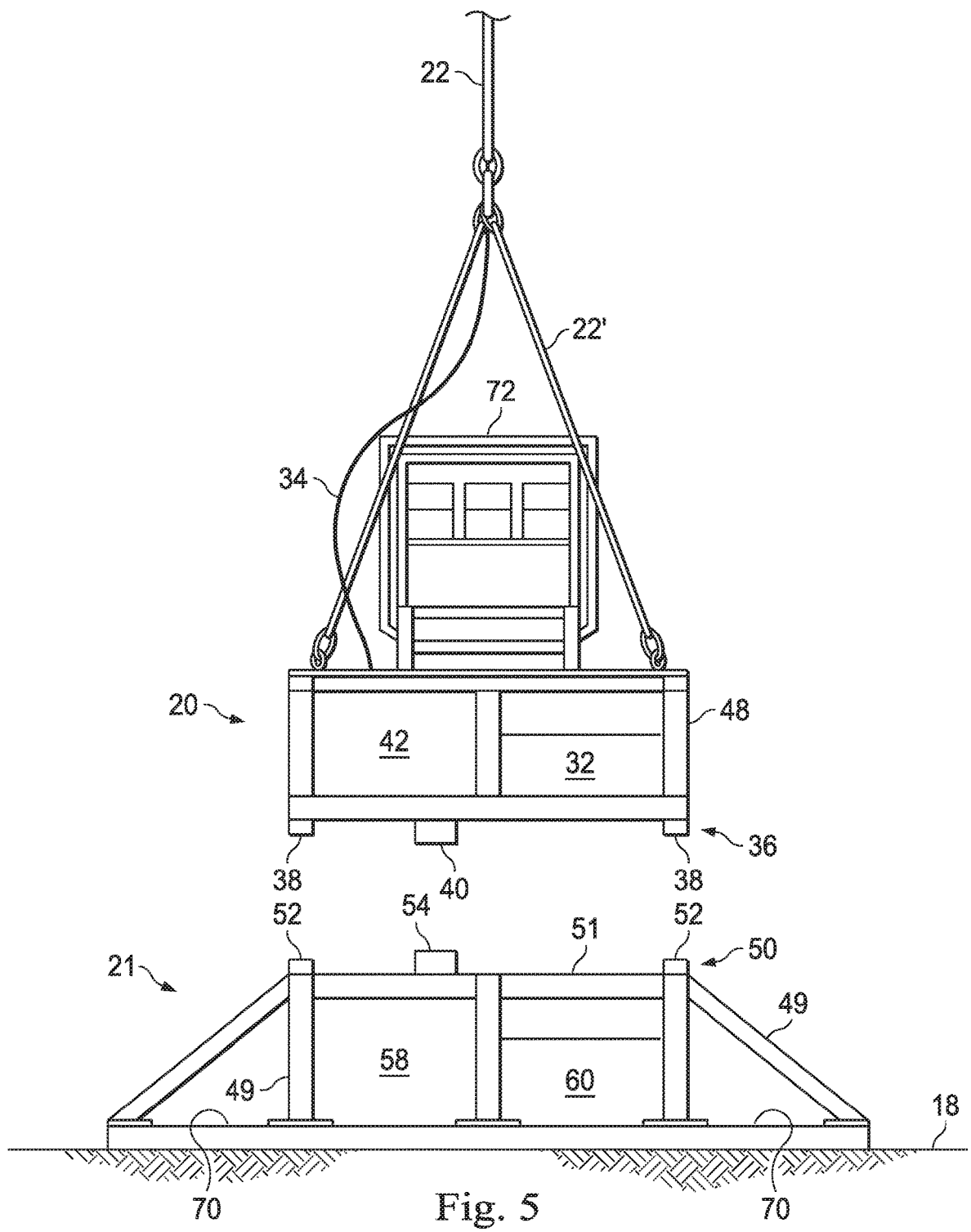
FIG. 5 is an elevation view of a subsea pump and power system prior to engagement of the power module with a base unit positioned on the seabed.

FIG. 5 illustrates power module 20 being lowered by tether 22 onto base unit 21 deployed on the seabed 18. Engagement mechanism 36 of power module 20 is aligned with engagement mechanism 50 of base unit 21 so that the engagement mechanisms engage one another. In particular, operational connector 54 and operational connector 40 may engage one another to establish fluid communication between base unit 21 and power module 20. For example, fluid communication between hydraulic pump 42 of power module 20 and process pump 47 of base unit 21. Tether 22 may be attached to linking members 22', which may be rigid supports or flexible cables.

Figure 6:
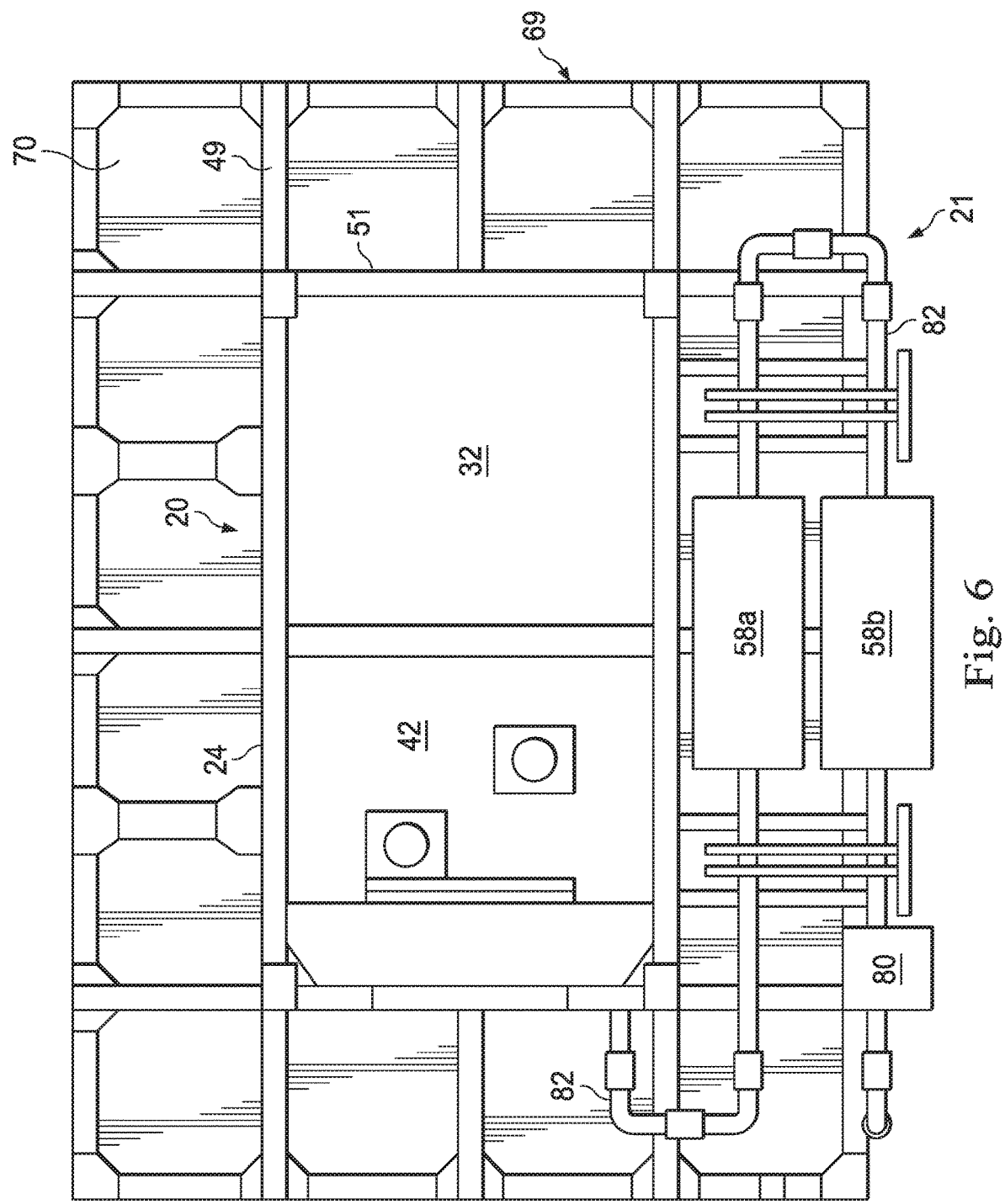
FIG. 6 is a plan view of the base unit of a subsea pump and power system.

FIG. 6 is a plan view of power module 20 as mounted on a top side 51 of base unit 21. In one or more embodiments, power module 20 may be centrally positioned on the top side 51 of base unit 21 so that the weight of power module 20 may be more evenly distributed on base unit 21. In the illustrated embodiment, a first filter module 58a and a second filter module 58b are illustrated. First filter module 58a and second filter module 58b may be mounted on either base unit 21 or power module 20. Sea water is drawn into first filter module 58a through an intake 80 and subsequently pumped through lines 82. A motor 32 on power module 20 may be utilized to operate a treatment pump 60 on base unit 21 to draw sea water in through intake 80.

Figure 7A:
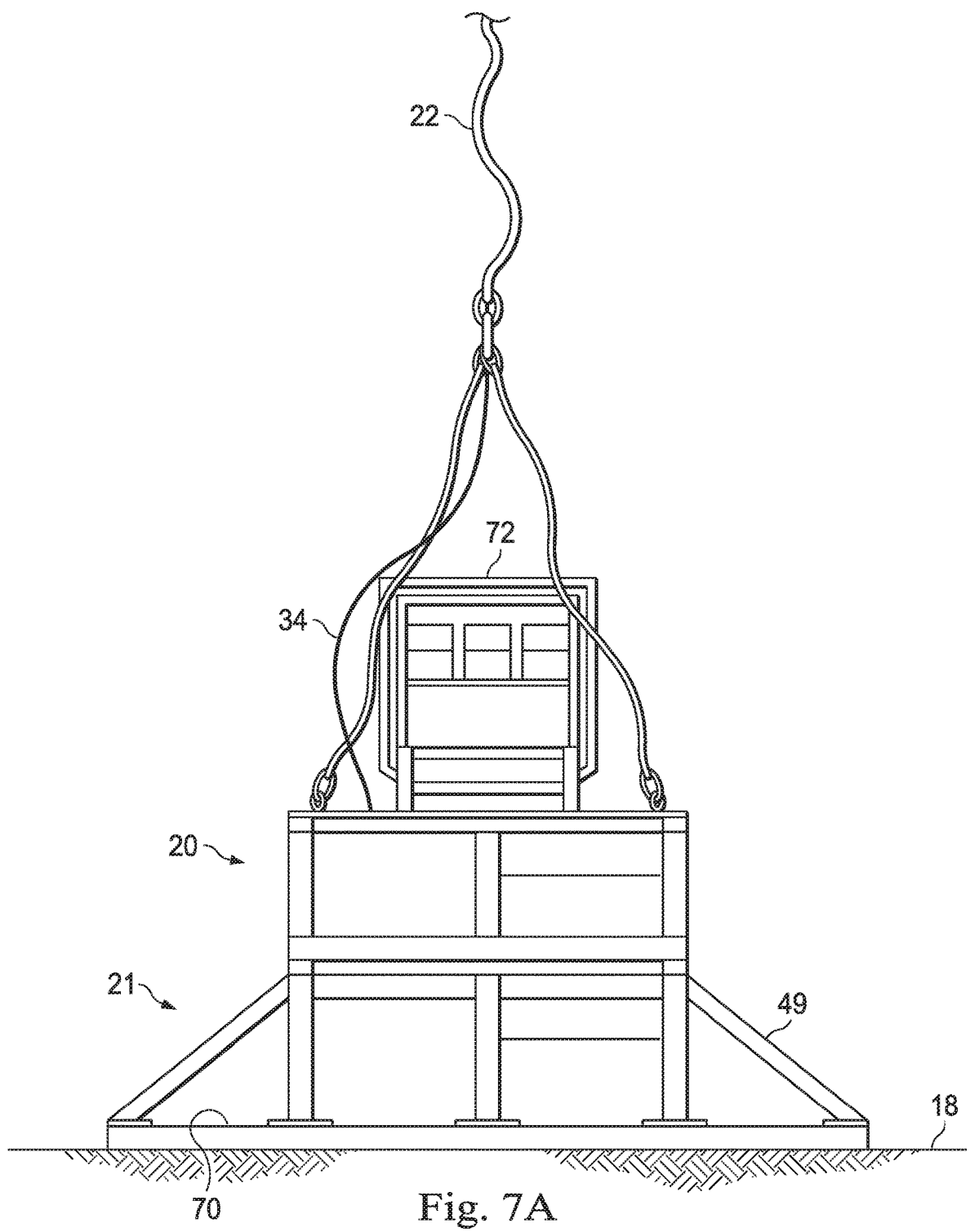
FIG. 7A is an elevation view of a subsea pump and power system following engagement of the power module with a base unit on the seabed.

FIG. 7A illustrate power module 20 mounted on the top side 51 of base unit 21 deployed on the seabed 18. When power module 20 is seated on the top side 51 of base unit 21, engagement mechanism 36 of power module 20 engages engagement mechanism 50 of base unit 21, thereby establishing mechanical attachment and electric and/or fluidic and/or fiber optic coupling between base unit 21 and power module 20. Once power module 20 is mounted on base unit 21, tension is removed from tether 22 and tether 22 may be become slack, as illustrated, since tether 22 is no longer supporting power module 20. Moreover, once power module 20 is mounted on base unit 21, electric motor 32 and/or hydraulic pump 42 may thereafter be operated to provide power to base unit 21 for various subsea pumping procedures.

FIG. 7B is a perspective view of a subsea pump and power system 17 once a power module 20 has been engaged with a base unit 21. A process pump 47 is illustrated, along with a water treatment system 56, carried by a skid or frame 49 of base unit 21. Supported on base unit 21 is power module 20 with umbilical 34 extending therefrom. Frame 49 may further include a mud mat assembly 69 having one or more mud mats 70 extending from base unit 21 to support the weight of subsea pump and power system 17 when deployed.

Figure 8:
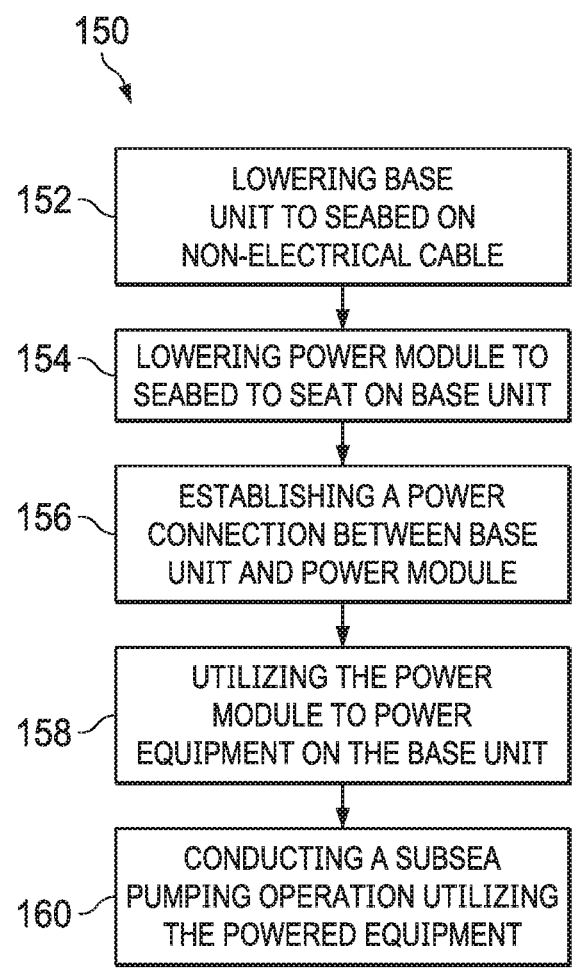
FIG. 8 is a flowchart of a method for performing subsea pipeline operations.

With reference to FIG. 8, a method 150 for conducting subsea pumping operations is illustrated. In a first step 152, a base unit, such as base unit 21 described above, is deployed from a surface vessel to the seabed by lowering the base unit to the seabed and positioning the base unit on the seabed in a desired location, such as adjacent a hydrocarbon production facility 10. The base unit is lowered on a first cable, which is a non-electrical heavy lift cable or line selected to bear the weight of the equipment carried on the base unit. In this regard, the base unit includes all process pumps to be utilized in a subsea pumping operation. The base unit may include chemical tanks to be utilized in the subsea pumping operations. The base unit may include water treatment systems to be utilized in the subsea pumping operations.

Following deployment of the base unit, in step 154, a power module, such as power module 20 described above, is deployed from a surface vessel to the seabed by lowering the power module to the seabed and positioning the power module on the base unit so that the base unit supports the power module on the seabed. In one or more embodiments, the base unit may be lowered on a second cable, namely a tether or power cable from the surface vessel. In one or more embodiments, the tether may be or otherwise include an electrical umbilical, a hydraulic umbilical and/or a fiber optic element. It will be appreciated that because the tether does not have the same weight bearing capacity as the heavy lift cable utilized for deployment of the base unit, the power module may only carry equipment utilized to power the pumps or other equipment carried on the base unit. Thus, the power module may only include an electric motor and/or a hydraulic pump and/or a power unit. In deploying the power module, the power module is positioned on the base unit so as to be supported by the base unit on the seabed. In this regard, the power module is seated on the base unit and may be secured to the base unit with one or more engagement mechanisms, such as self-latching mechanical connectors that secure upon seating.

In an alternative embodiment of step 154, the power module may likewise be lowered on a non-electrical heavy lift cable or line. In such an embodiment, a tether may be connected to the power module but not utilized to lower the power module or support the weight of the power module. In another embodiment, a tether may be transported down with the power module adjacent the heavy lift cable and electrically and/or hydraulically connected to the power module, such as by an ROV, once the power module is seated on the base unit.

In step 156, once the power module is seated on the base unit, a power connection is established between the power module and the base unit. The power connection allows the base unit to provide electrical and/or hydraulic power to the base unit. In one or more embodiments, an ROV may be utilized to establish the power connection. For example, an ROV may be utilized to connect hydraulic lines from the power module to a pump or hydraulic motor on the base unit or to connect an electrical line from the power module to an electric process pump on the base unit. In one or more embodiments, the power connection may be established as the power module is seated on the base unit. In such an embodiment, the base unit and power module may include electrical and/or hydraulic operational connectors that hot stab into one another as the power module is seated, thereby establishing the power connection between the power module and the base unit.

In step 158, the power module powers the equipment on the base unit. Specifically, the umbilical extending down from the surface is utilized to supply electricity and/or hydraulic fluid to the power unit. For example, the umbilical provides electricity to the electric motor on power module, which electric motor in turn is utilized to drive a hydraulic pump on the power module to pressurize hydraulic fluid. The pressurized hydraulic fluid is then used to power the process pump(s) on the base unit and/or operate other equipment on the base unit.

In step 160, the powered equipment on the base unit is utilized to carry out one or more pumping operation, such as hydrostatic testing operations, pigging operations, hydraulic fracturing operations, and chemical injection operations.

In yet another alternative embodiment, as discussed above, the deployed power module may be replaced with another power module. In such case, pumping operations are suspended and the first power module is detached from the base unit. The first power module may be retrieved on the umbilical and a second power module may be deployed on the umbilical and attached to the base unit. Thereafter, the second power module may be utilized to operate equipment carried by the base unit.

The subsea pump and power system as described herein can provide higher available horsepower for the pumping systems than is available in the prior art, and need not rely on an ROV for power and nor be limited to the power available from an ROV. With increased power available, much greater fluid flow can be achieved in boost, injection and hydrotest pumping operations, than exists in prior art subsea units. Increased horsepower will allow higher pump flowrates and/or pressures to be achieved during these subsea pumping operations, which will allow reduced operational timescale. While the subsea pump and power system has generally been described in terms of hydrostatic testing and pigging operations, it will be appreciated that the system may be utilized in other subsea pumping operations, such as subsea well fracturing, well stimulation, and chemical injection. Thus the subsea pump and power system may be operated for free-flooding, forced flooding, pig propulsion, flushing, fluid displacement, dewatering, hydrotesting, water injection, chemical treatment, hydraulic fracturing, scale squeeze, hydrate remediation, ultra violet treatment of fluids and used either individually or in any combination thereof. Additionally, the communications umbilical permits greater control of subsea pump and power system, particularly in real time, than prior art hydrostatic and pigging pumping systems.

Thus, a subsea pump and power system has been described. In one or more embodiments, the subsea pump and power system includes a base unit having a frame carrying a water treatment system and an operational connector; and a power module, detachably mountable to the base unit, the power module having at least one motor, an umbilical for driving the motor, at least one hydraulic pump driven by the motor, an operational connector in fluid communication with the pump and engageable by the operational connector of the base unit. In one or more embodiments, the subsea pump and power system includes a base unit having a frame carrying a water treatment system and an operational connector in fluid communication with the water treatment system; and a power module, detachably mountable to the base unit, the power module having at least one motor, an umbilical for driving the motor, at least one hydraulic pump driven by the motor, an operational connector in fluid communication with the pump and engageable by the operational connector of the base unit. In one or more embodiments, the subsea pump and power system includes a power module having at least one motor, an umbilical for driving the motor, at least one hydraulic pump driven by the motor, an operational connector in fluid communication with the pump and engageable by the operational connector of the base unit; and a base unit, detachably engageable by the power module, the base unit having a frame carrying a water treatment system and at least one process pump drivable by the motor of the power module.

For any one of the foregoing embodiments of a subsea pump and power system, the following elements may be included, alone or in combination with any other elements:
  Mud mats extending from the frame of the base unit.
  The operational connector of the base unit is in fluid communication with a process pump carried by the frame of the base unit.
  The umbilical is a hydraulic umbilical coupled to a hydraulic power source.
  The umbilical is an electric umbilical coupled to an electric power source.
  The umbilical comprises an electric line, a hydraulic line and a fiber optic line.
  A mechanical connector on the base unit that engages a mechanical connector on the power module to secure the power module to the base unit and an operation connector on the base unit that engages an operational connector on the power module to power a pump on the base unit.
  An ROV independent of the power module and base unit, the ROV attached to a second umbilical.
  A manipulator arm attached to the base unit.
  A hydraulic pump on the power module is in fluid communication with a manipulator arm on the base unit.
  Water treatment system comprises a filter module.
  Water treatment system comprises a filter module and pump.
  A portion of the water treatment system is carried by the base unit and a portion of the water treatment system is carried by the power module.
  One or more pumps of the water treatment system are carried by the base unit and one or more filters of the water treatment system are carried by the power module.
  One or more fluid vessels carried by the base unit.
  One or more chemical vessels carried by the base unit.
  One or more water treatment vessels carried by the base unit.
  Water treatment system comprises an ultra-violet light module.
  Water treatment system comprises an ultra-violet (UV) light module and pump.
  Water treatment system comprises a filter module, an ultra-violet (UV) light module and a pump.
  At least one process pump comprises a first pump and a second pump.
  The first pump is a high pressure pump and the second pump is a low pressure, high volume pump.
  The first pump is a hydrostatic testing pump and the second pump is a pigging pump.
  The base unit has negative buoyancy.
  The power module has negative buoyancy.
  Power module is mounted on a top side of the base unit.
  The operational connector of the base unit is in fluid communication with the operational connector of the power module.
  A mechanical connector on the base unit that engages a mechanical connector on the power module to secure the power module to the base unit.

Thus a method for performing subsea pumping operations has been described. In one or more embodiments, a method for performing subsea pumping operations in a subsea hydrocarbon production facility includes deploying a base unit to the seabed from a vessel, the base unit having water treatment system mounted on a frame; once the base unit is deployed, lowering a power module on a tether from a vessel, the power module having a motor; attaching the power module to the base unit; utilizing an umbilical extending down from a vessel to operate the motor; utilizing the motor to operate a pump carried by the base unit to pump sea water through the water treatment system and into the subsea hydrocarbon production facility. In one or more embodiments, a method for performing subsea pumping operations in a subsea hydrocarbon production facility includes deploying a base unit to the seabed from a vessel, the base unit having water treatment system mounted on a frame; independently of the base unit, utilizing a tether to lowering a negative buoyancy power module from a vessel, the power module having a motor; attaching the power module to the base unit; utilizing an umbilical extending down from a vessel to operate the motor; and utilizing the motor to operate a pump carried by the base unit to pump sea water through the water treatment system and into the subsea hydrocarbon production facility. In one or more embodiments, a method for performing subsea pumping operations in a subsea hydrocarbon production facility includes mounting a detachable power module on a base unit, the power module having a motor; deploying the base unit and power module to the seabed from a vessel utilizing a non-conductive heavy lift cable, the base unit having water treatment system mounted on a frame; once the base unit is positioned on the seabed, attaching a power umbilical to the power module; utilizing the umbilical extending down from a vessel to operate the motor; and utilizing the motor to operate a pump carried by the base unit to pump sea water through the water treatment system and into the subsea hydrocarbon production facility.

For any one of the foregoing embodiments of a subsea pumping operation, the following elements may be included, alone or in combination with any other elements:
  Lowering the power module onto a top side of the base unit and securing the power module to the top side of the base unit.
  Establishing fluidic connections between the base unit and the power module as the power module is lowered onto the base unit.
  Attaching a fluid e to the subsea hydrocarbon production facility from one of the base unit or the power module.
  The fluid line is attached from the base unit to the hydrocarbon production facility prior to attaching the power module to the base unit.

Suspending pumping operations; detaching the power module from the base unit; retrieving the power module to a vessel; deploying a different power module to the base unit; attaching the different power module to the base unit; and utilizing the different power unit to operate a pump carried by the base unit to pump sea water through the water treatment system and into the subsea hydrocarbon production facility.

Utilizing the base unit and the power module to perform hydrostatic testing operations of hydrocarbon production facility.

Utilizing the base unit and the power module to perform pigging operations of hydrocarbon production facility.

Utilizing the base unit and the power module to perform hydraulic fracturing operations of hydrocarbon production facility.

Utilizing the base unit and the power module to perform chemical injection operations of hydrocarbon production facility.

Detaching the power module from the base unit and retrieving the power module utilizing the umbilical; and thereafter deploying a base unit on an umbilical and attaching the power module to the base unit deployed on the seabed.

Utilizing an ROV on a second umbilical to attach the power umbilical to the power module.

Utilizing an ROV on a second umbilical to attach the power umbilical to the power module once the base unit is positioned on the seabed.

Utilizing an ROV on a second umbilical to attach the power umbilical to the power module once the power module is attached to the base unit on the seabed.

Utilizing the base unit to flood a pipeline prior to attaching the power module to the base unit.

Utilizing the base unit to flood a pipeline while the power module is being lowered on an umbilical.

Utilizing an ROV on a second umbilical to attach one of the power unit or the base unit to the hydrocarbon production facility.

Suspending pumping operations; detaching the power module from the base unit; retrieving the power module to a vessel; deploying a second power module to the base unit; attaching the second power module to the base unit; and utilizing the second power unit to operate a pump carried by the base unit.

Utilizing the base unit and the power module to perform a pumping operation selected from the group consisting of hydrostatic testing operations, pigging operations, hydraulic fracturing operations, and chemical injection operations.

What is claimed is:

1. A subsea pump and power system comprising:
a base unit having an operational connector and a frame carrying a water treatment system; and
a power module, detachably mountable to the base unit and supported by the base unit above the base unit, the power module having at least one electric motor, an electric umbilical extending from the power module and coupled to the electric motor for driving the motor, at least one hydraulic pump driven by the electric motor, an operational connector in fluid communication with the hydraulic pump and engageable by the operational connector of the base unit.

2. The subsea pump and power system of claim 1, the base unit further comprising a process pump, wherein the operational connector of the base unit is in fluid communication with the process pump carried by the frame of the base unit.

3. The subsea pump and power system of claim 1, further comprising mud mats extending from the frame of the base unit.

4. The subsea pump and power system of claim 1, wherein water treatment system comprises a filter module.

5. The subsea pump and power system of claim 1; wherein Ovate ent system comprises a plurality of interchangeable filter modules.

6. The subsea pump and power system of claim 1 wherein one or more pumps of the water treatment system are carried by the base unit and one or more filters of the water treatment system are carried by the power module.

7. The subsea pump and power system of claim 1, further comprising one or more fluid vessels carried by the frame of the base unit.

8. The subsea pump and power system of claim 1, wherein water treatment system comprises an ultra-violet (UV) light module.

9. The subsea pump and power system of claim 1, wherein at least one process pump comprises a first pump and a second pump, wherein the first pump is a high pressure pump and the second pump is a low pressure, high volume pump.

10. The subsea pump and power system of claim 1, further comprising a mechanical connector on the base unit that engages a mechanical connector on the power module to secure the power module to the base unit.

11. A subsea pump and power system comprising:
a power module having at least one electric motor, an electric umbilical extending from the power module and coupled to the electric motor for driving the electric motor, at least one hydraulic pump driven by the electric motor, an operational connector in fluid communication with the hydraulic pump and positioned below at least one of the electric motor or the hydraulic pump; and
a base unit, detachably engageable by the power module and supporting the power module, the base unit having an operational connector engageable by the operational connector of power module and a frame carrying a water treatment system and at least one process pump drivable by the hydraulic pump of the power module.

12. The subsea pump and power system of claim 11, wherein water treatment system comprises a filter module.

13. The subsea pump and power system of claim 12, wherein water treatment system comprises a fluid vessel carried by the frame of the base unit.

14. The subsea pump and power system of claim 11, wherein water treatment system comprises an ultra-violet (UV) light module.

15. The subsea pump and power system of claim 11, wherein at least one process pump comprises a first pump and a second pump, wherein the first pump is a high pressure pump and the second pump is a low pressure, high volume pump.

16. The subsea pump and power system of claim 11, further comprising a mechanical connector on the base unit that engages a mechanical connector on the power module to secure the power module to the base unit and an operation connector on the base unit that engages an operational connector on the power module to power a process pump on the base unit.

17. A method for performing subsea pumping operations in a subsea hydrocarbon production facility, the method comprising:

deploying a base unit to the seabed from a vessel, the base unit having water treatment system mounted on a frame;

lowering a power module on a tether from a vessel, the power module having an electric motor;

attaching the power module to the top side of the base unit so that the base unit supports the power module above and spaced apart from the seabed;

utilizing an umbilical extending down from a vessel and attached to the power module to operate the electric motor; and utilizing the motor to operate a process pump carried by the base unit to pump sea water through the water treatment system and into the subsea hydrocarbon production facility.

18. The method of claim 17, further comprising utilizing the base unit to flood a pipeline prior to attaching the power module to the base unit.

19. The method of claim 17, further comprising suspending pumping operations;

detaching the power module from the base unit; retrieving the power module to a vessel;

deploying a second power module to the base unit; attaching a second power module to the base unit; and utilizing the second power unit to operate a pump carried by the base unit.

20. The method of claim 17; further comprising utilizing the base unit and the power module to perform a pumping operation selected from the group consisting of hydrostatic testing operations, pigging operations, hydraulic fracturing operations, and chemical Injection operations.

* * * * *

UNITED STATES PATENT AND TRADEMARK OFFICE
CERTIFICATE OF CORRECTION

PATENT NO. : 10,738,913 B2
APPLICATION NO. : 16/534920
DATED : August 11, 2020
INVENTOR(S) : Alan Cameron Clunie et al.

Page 1 of 1

It is certified that error appears in the above-identified patent and that said Letters Patent is hereby corrected as shown below:

In the Specification

Column 2, Line 31, change "requiting" to -- requiring --

Column 4, Line 30, change "Well head" to -- Wellhead --

Column 7, Line 12, change "son" to -- soft --

Column 10, Line 4, change "al low" to -- allow --

Column 14, Line 63, change "e" to -- line --

In the Claims

Column 16, Line 7, Claim 5, change "Ovate ent" to -- water treatment --

Signed and Sealed this
Nineteenth Day of January, 2021

Andrei Iancu
*Director of the United States Patent and Trademark Office*